United States Patent [19]

Kobayashi et al.

[11] Patent Number: 5,261,476
[45] Date of Patent: Nov. 16, 1993

[54] BEAD STRUCTURE FOR PNEUMATIC TIRE

[75] Inventors: Yasuhiko Kobayashi; Hiroyuki Koseki, both of Kodaira, Japan

[73] Assignee: Bridgestone Corporation, Tokyo, Japan

[21] Appl. No.: 704,147

[22] Filed: May 22, 1991

[30] Foreign Application Priority Data

May 23, 1990 [JP] Japan .................. 2-133313

[51] Int. Cl.$^5$ .............................. B60C 15/06
[52] U.S. Cl. ......................... 152/541; 152/546; 152/547
[58] Field of Search ............ 152/539, 541, 542, 543, 152/546, 547

[56] References Cited

U.S. PATENT DOCUMENTS

| | | |
|---|---|---|
| 4,185,677 | 1/1980 | Motomura et al. ............. 152/546 |
| 4,215,737 | 8/1980 | Motomura et al. ............. 152/541 |
| 4,366,851 | 1/1983 | Makino et al. ................. 152/546 |
| 4,510,984 | 4/1985 | Kishida et al. ................. 152/543 |
| 4,699,194 | 10/1987 | Iuchi ............................. 152/541 |
| 4,953,605 | 9/1990 | Kawamura et al. ........... 152/546 |

FOREIGN PATENT DOCUMENTS

| | | |
|---|---|---|
| 0158539 | 10/1985 | European Pat. Off. . |
| 0202925 | 5/1986 | European Pat. Off. . |
| 0206679 | 12/1986 | European Pat. Off. . |
| 0251145 | 1/1988 | European Pat. Off. . |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire comprises a radial carcass of at least one carcass ply wound around each of bead cores from inside toward outside to form a turnup portion, an outer ply inclusive of the turnup portion containing cords each having a modulus of elasticity of not less than 2500 kg/mm$^2$ and a diameter d, and a rubber stiffener arranged at its radially inward portion between the carcass ply and the outer ply. In a bead structure of such a pneumatic tire, the stiffener is divided into an inner stiffener portion and an outer stiffener portion around a specified boundary plane, and each of these stiffener portions is comprised of rubber having a given Shore A hardness, and a volume ratio of the outer stiffener portion in the stiffener is not less than 10%.

3 Claims, 4 Drawing Sheets

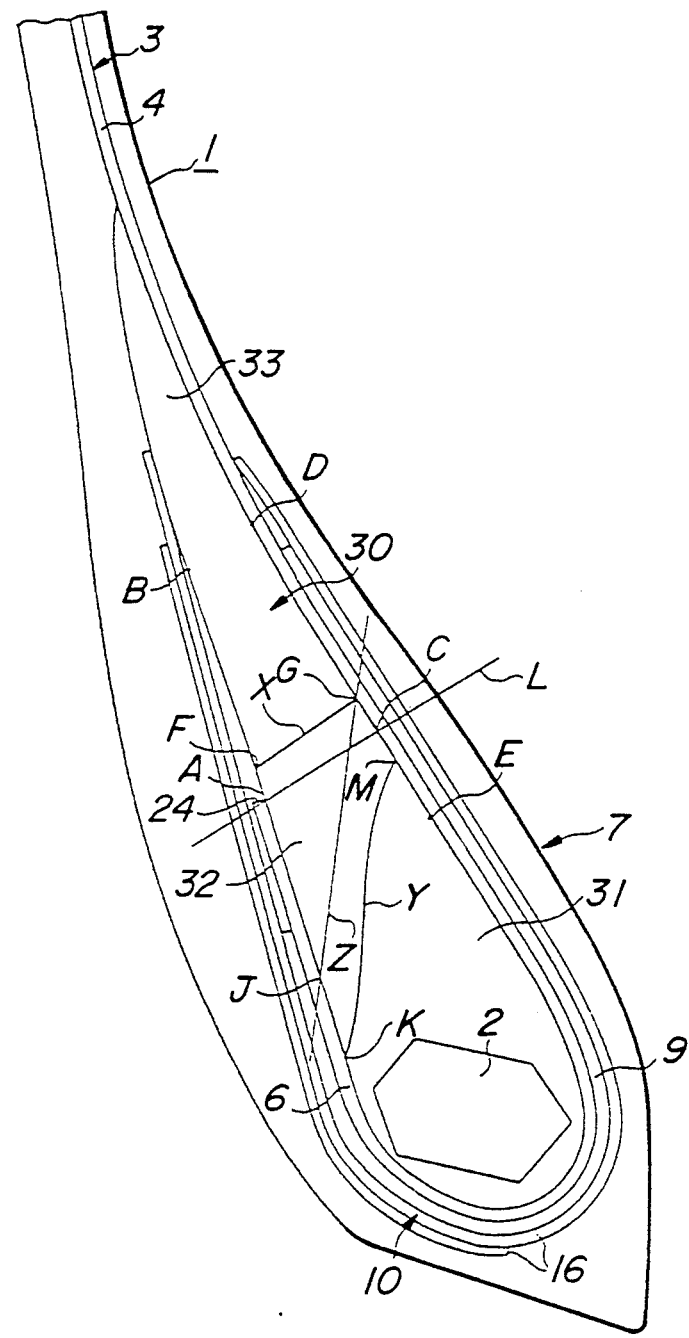
FIG_3

FIG_4
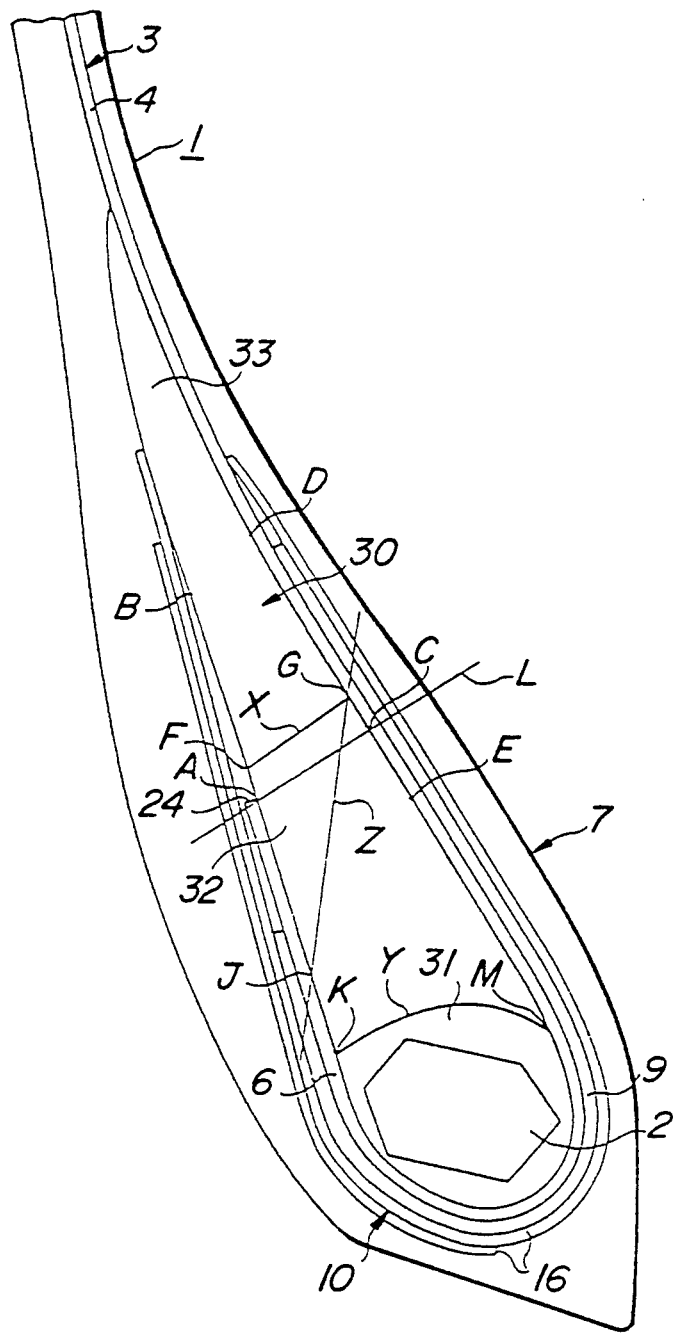

BEAD STRUCTURE FOR PNEUMATIC TIRE

FIELD OF THE INVENTION

1. Field of the Invention

This invention relates to a bead structure for a pneumatic tire having an improved bead portion durability.

2. Related Art Statement

In general, when a load is applied to a pneumatic tire, the sidewall portion of the tire is bent at the ground contacting side due to a reaction force from the road surface against the load such a bending is transferred to the bead portion. In this case, when cords embedded in the turnup portion of the carcass ply are inextensible cords such as cords having a modulus of elasticity of not less than 2500 kg/mm$^2$, the turnup portion itself is hardly deformed. As a result, a large compression strain is produced in a radially outward end of the turnup portion and rubber surrounding the radially outward end by the above bending. Such a compression strain is repeatedly applied to the turnup portion at the ground contacting side during the running of the tire, so that cracks are caused in the rubber near the radially outward end part of the turnup portion and thus separation failure may result.

Heretofore, in order to prevent the occurrence of separation at the turnup end, it has been proposed to control the compression strain by increasing a Shore A hardness of a stiffener, or arranging a reinforcing ply containing inextensible cords therein at the outside of the turnup portion in the axial direction along the turnup portion in such a manner that the radially outward end of the reinforcing ply is higher than the radially outward end of the turnup portion.

In the conventional pneumatic tire, however, the weight becomes heavy as the bending rigidity of the bead portion becomes high, so that heat generation occurs in the bead portion during running. Also, the rolling resistance of the tire becomes undesirably large. In the latter case, a large compression strain is also produced in the vicinity of the radially outward end of the reinforcing ply to undesirably cause the separation failure.

SUMMARY OF THE INVENTION

It is, therefore, an object of the invention to provide a bead portion structure of a pneumatic tire capable of preventing the occurrence of separation failure in the vicinity of a radially outward end of the outer ply such as the turnup portion of the carcass ply and the reinforcing ply while preventing heat generation in the bead portion and the increase of the rolling resistance.

According to a first aspect of the invention, a bead portion structure in a pneumatic tire comprising a radial carcass is comprised of at least one carcass ply containing cords substantially extended in a radial direction of the tire and wound around each of plurality of bead cores from the inside toward the outside to form a turnup portion, an outer ply inclusive of the turnup portion arranged outside the carcass ply in the axial direction of the tire and extended along the carcass ply and containing cords each having a modulus of elasticity of not less than 2500 kg/mm$^2$ and a diameter d, and a rubber stiffener arranged at its radially inward portion between the carcass ply and the outer ply and contacted at its radially inward end with the bead core, characterized in that when positions located on the outer surface of the stiffener and separated from the radially outward end of the outer ply by 1 times and 30 times of the cord diameter d in a direction of separation from the bead core are A and B, respectively, and an intersection of a straight line L passing the radially outward end of the outer ply and perpendicular to the inner surface of the stiffener with the inner surface of the stiffener is C, and a position located on the inner surface of the stiffener and separated from the intersection C by 30 times of the cord diameter d in a direction of separation from the bead core is D, and a position located on the inner surface of the stiffener and separated from the intersection C by 10 times of the cord diameter d in a direction approaching the bead core is E, and a position located on the outer surface of the stiffener between the positions A and B is F, and a position located on the inner surface of the stiffener between the positions D and E is G, said stiffener is divided into an inner stiffener portion located radially inward from a boundary plane X connecting the position F to the position G and an outer stiffener portion located radially outward from the boundary plane X, and the inner stiffener portion is comprised of rubber having a Shore A hardness of 58° to 68° and the outer stiffener portion is comprised of rubber having a Shore A hardness of not more than 55°, and a volume ratio of the outer stiffener portion in the stiffener is not less than 10%.

According to a second aspect of the invention, a bead portion structure in a pneumatic tire comprising a radial carcass is comprised of at least one carcass ply containing cords substantially extended in a radial direction of the tire and wound around each of a plurality of bead cores from the inside toward the outside to form a turnup portion, an outer ply inclusive of the turnup portion arranged outside the carcass ply in an axial direction of the tire and extended along the carcass ply and containing cords each having a modulus of elasticity of not less than 2500 kg/mm$^2$ and a diameter d, and a rubber stiffener arranged at its radially inward portion between the carcass ply and the outer ply and contacted at its radially inward end with the bead core, characterized in that when positions located on the outer surface of the stiffener and separated from the radially outward end of the outer ply by 1 times and 30 times of the cord diameter d in a direction of separation from the bead core are A and B, respectively, and an intersection of a straight line L passing the radially outward end of the outer ply and perpendicular to the inner surface of the stiffener with the inner surface of the stiffener is C, and a position located on the inner surface of the stiffener and separated from the intersection C by 30 times of the cord diameter d in a direction of separation from the bead core is D, and a position located on the inner surface of the stiffener and separated from the intersection C by 10 times of the cord diameter d in a direction approaching the bead core is E, and a position located on the outer surface of the stiffener and separated from the radially outward end of the outer ply by 10 times of the cord diameter d in a direction approaching to the bead core is J, and a position located on the outer surface of the stiffener between the positions A and B is F, and a position located on the inner surface of the stiffener between the positions D and E is G, and a position located on the outer surface of the stiffener and at a side of approaching from the position J to the bead core is K, and a position located on the inner surface of the stiffener and at a side of approaching from the position G to the bead core is M, said stiffener is divided into a base stiffener portion located radially inward from a boundary plane Y connecting the position K to the position M, an inner stiffener portion located radially outward from the boundary plane Y and radially inward from a boundary plane X connecting the position F to the position G and an outer stiffener portion located radially outward from the boundary plane X, and the base stiffener portion is comprised of rubber having a Shore A hardness of not less than 75° and the inner stiffener portion is comprised of rubber having a Shore A hardness of 58° to 68° and the outer stiffener portion is comprised of rubber having a Shore A hardness of not more than 55°, and a volume ratio of the outer stiffener portion in the stiffener is not less than 10%.

BRIEF DESCRIPTION OF THE DRAWINGS

FIGS. 3 and 4 are enlarged section views of a bead portion in second and third embodiments of the pneumatic tire according to the invention, respectively.

DESCRIPTION OF THE PREFERRED EMBODIMENTS

According to the invention, the outer stiffener portion located radially outward from the radially outward end of the outer ply is comprised of an easily deformable rubber having a Shore A hardness of not more than 55°, so that the bending produced in the running of the tire and transferred to the bead portion is absorbed by the deformation of the outer stiffener portion, whereby compression strain generated in the radially outward end of the outer ply is considerably reduced and hence the occurrence of separation failure in the vicinity of the radially outward end of the outer ply is prevented. Moreover, in order to effectively absorb the above bending, it is necessary to specify the arranging position and volume ratio of the outer stiffener portion. According to the invention, the arranging position of the outer stiffener portion is defined to be radially outward from the boundary plane X, and the volume ratio is defined in relation to the full stiffener. Furthermore, the Shore A hardness of the stiffener at a portion contacting with the bead core may be increased in accordance with the kind of the tire. That is, the base stiffener portion having a high Shore A hardness is arranged radially inward from the boundary plane Y, which is the second aspect of the invention. In any case, the radially outward portion of the stiffener is the outer stiffener portion having a small rubber hardness, so that the bending rigidity of the bead portion is low and the tire weight is not increased and also the heat generation of the bead portion is not caused and the rolling resistance is low.

Figure 1:
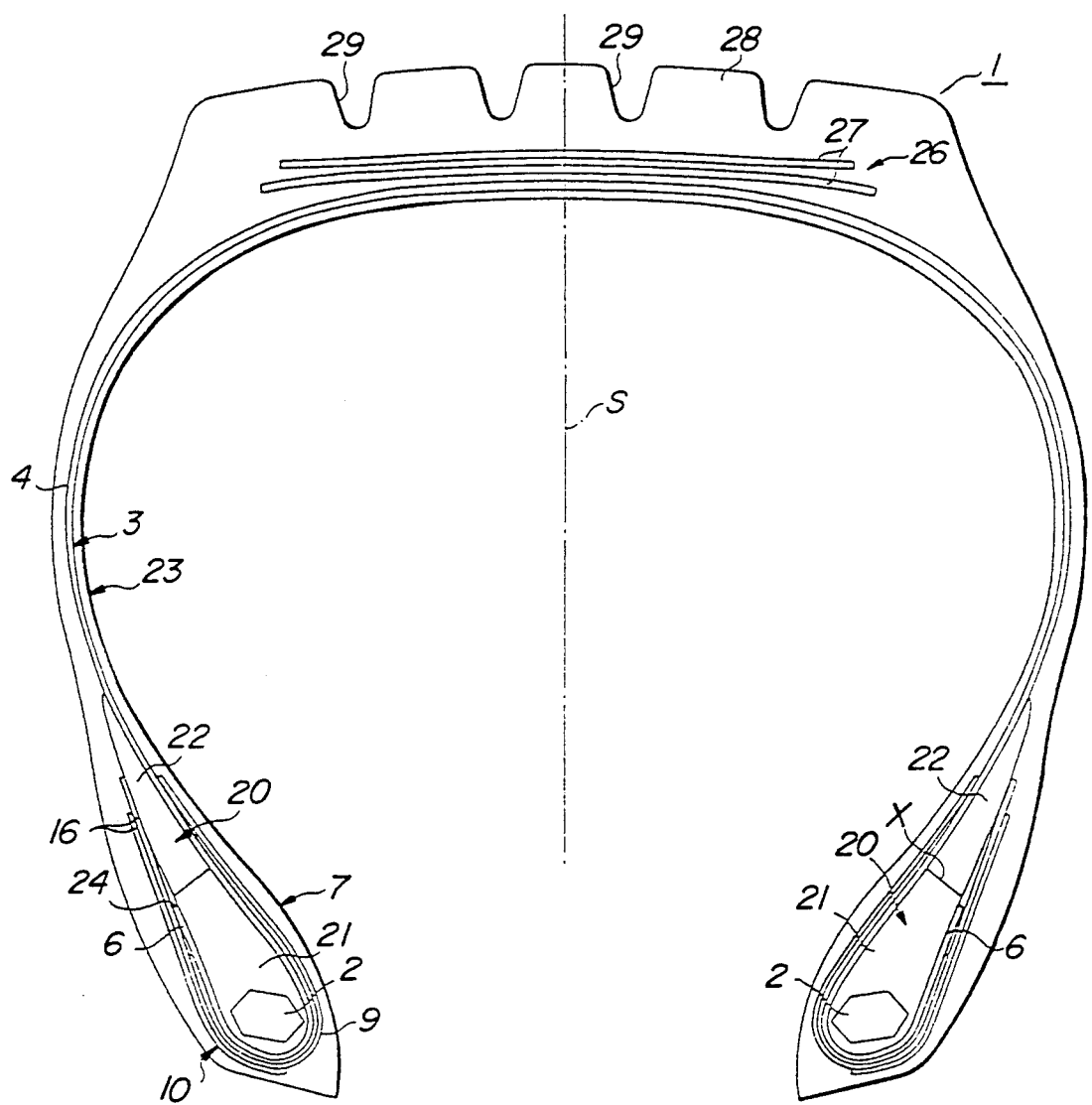
FIG. 1 is a radially schematic section view of a first embodiment of the pneumatic tire according to the invention.
Figure 2:
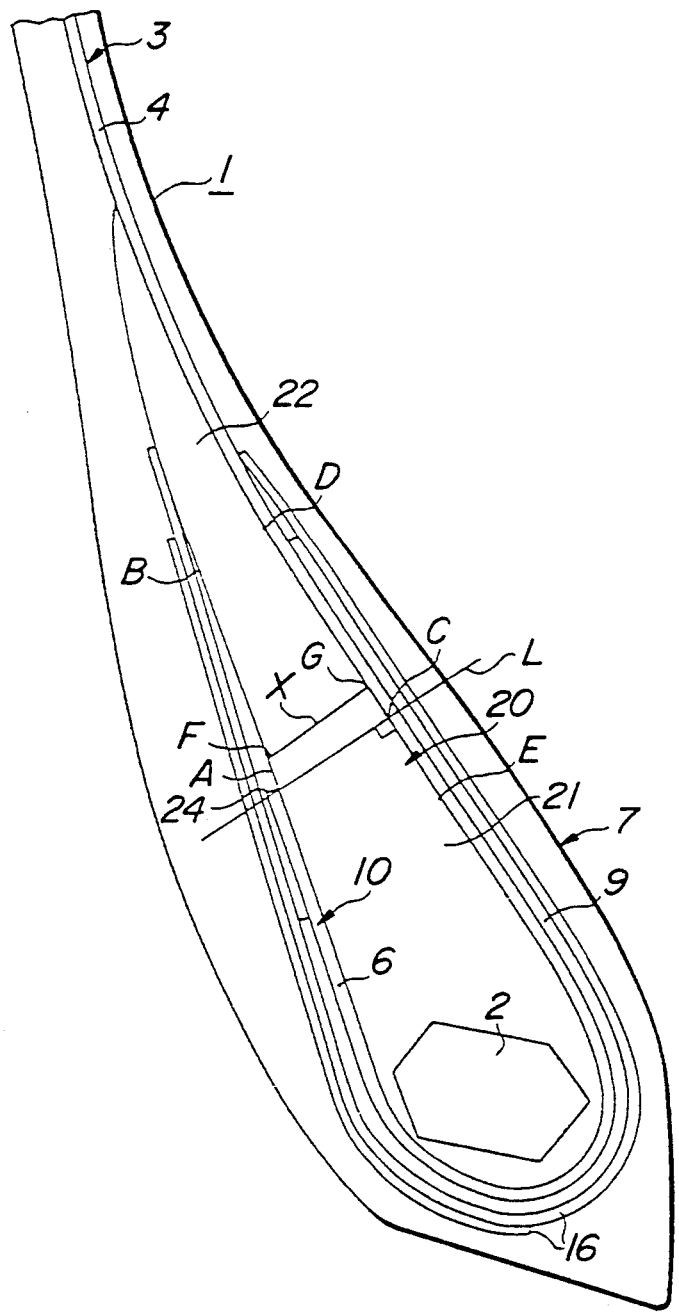
FIG. 2 is an enlarged section view of a bead portion in the tire of FIG. 1.

FIG. 1 and 2 show a first embodiment of the pneumatic tire according to the invention. This tire 1 comprises a pair of bead cores 2 and a toroidal carcass 3. The carcass 3 is comprised of at least one carcass ply 4 (one carcass ply in the illustrated embodiment). The carcass ply 4 extends between the bead cores 2 and radially wound around each bead core 2 from the inside of the tire toward the outside to form a turnup portion 6. That is, the bead core 2 is arranged between the carcass ply 4 and its turnup portion 6. Furthermore, the carcass ply 4 contains a plurality of cords having a modulus of elasticity of not less than 2500 kg/mm² (concretely 15000 kg/mm²) arranged at an angle of substantially 90° with respect to the equatorial plane of the tire. As the cord having a modulus of elasticity of not less than 2500 kg/mm², there are known, for example, steel cord and polyamide fiber cord (Kevlar cord). In the illustrated embodiment, a reinforcing ply 9 is arranged outside the carcass ply 4 therealong from the inside of the tire toward outside thereof, but it may be omitted. The reinforcing ply 9 contains the same cords as used in the carcass ply, i.e. cords having a modulus of elasticity of not less than 2500 kg/mm² arranged at an angle of 60° with respect to the equatorial plane. According to the invention, an outer ply 10 is defined by a ply arranged axially outward from the carcass ply 4 and containing cords having a modulus of elasticity of not less than 2500 kg/mm². That is, in the illustrated embodiment, the outer ply 10 is comprised of the turnup portion 6 of the carcass ply 4 and an outer portion of the reinforcing ply 9. Moreover, two auxiliary reinforcing plies 16 are arranged outside the reinforcing ply 9 so as to superimpose about the reinforcing ply 9, but these auxiliary reinforcing plies may be omitted. Each of these auxiliary reinforcing plies 16 is comprised of textile cords having a modulus of elasticity of about 350 kg/mm², so that they do not constitute a part of the outer ply 10.

A rubber stiffener, a radially inward end portion arranged between the carcass ply 4 and its turnup portion and a radially outward end extended near a maximum width of the tire 1. In this case, the radially inward end of the stiffener 20 contacts the bead core 2. A boundary plane X smoothly connects a position F located on the axially outward surface of the stiffener 20 to a position G located on the axially inward surface of the stiffener 20 as shown in FIG. 2. The stiffener 20 is divided into an inner stiffener portion 21 located radially inward from the boundary plane X and an outer stiffener portion 22 located radially outward from the boundary plane X. The inner stiffener portion 21 is composed of rubber having a Shore A hardness of 58° to 68° (concretely 63°), while the outer stiffener portion 22 is composed of an easily deformable rubber having a Shore A hardness of not more than 55° (concretely 49°), and also the volume ratio of the outer stiffener portion 22 in the stiffener 20 is not less than 10% (concretely 37%). Thus, even when the sidewall portion 23 is largely bent in the contacting with ground, such a bending is absorbed by the deformation of the outer stiffener portion 22, whereby the compression strain produced in the radially outward end 24 of the outer ply 10 is reduced to prevent the separation in the vicinity of the radially outward end of the outer ply 10. When the Shore A hardness of the inner stiffener portion 21 is less than 58°, the whole of the stiffener 20 becomes too flexible and hence the bending of the sidewall portion 23 in the contacting the ground becomes large, so that the shearing strain concentrates in a region between the outer ply 10 and the carcass ply 4, particularly axially inside the radially outward end of the outer ply 10 to cause separation failure. On the other hand, when the Shore A hardness of the inner stiffener portion 21 exceeds 68°, the rigidity of the bead portion 7 becomes too high and hence heat generation occurs in the bead portion and rolling resistance undesirably increases. Therefore, the Shore A hardness of the inner stiffener portion should be within a range of 58° to 68°. On the other hand, when the Shore A hardness of the outer stiffener portion 22 exceeds 55°, the bending is hardly absorbed and separation failure is generated, so that the Shore A hardness of the outer stiffener portion should be not more than 55°. Moreover, the Shore A hardness of the outer stiffener portion 22 is preferably within a range of 38° to 52°. This is because, when the Shore A hardness is less than 38°, the absorption of the bending by the outer stiffener portion 22 becomes too large and the compression strain and shearing strain of the rubber itself constituting the outer stiffener portion 22 becomes too large. Hence there is a fear of causing separation failure in the rubber itself constituting the outer stiffener portion or at the boundary plane between the outer stiffener portion 22 and the carcass ply 4. While when the Shore A hardness, exceeds 52°, the absorption of the bending becomes small. Furthermore, when the volume ratio of the outer stiffener portion 22 in the stiffener 20 is less than 10%, the effect of absorbing the above bending is small and the separation failure is generated in a radially outward end 24 of the outer ply 10, so that the volume ratio should be not less than 10%.

The position F is an optional position on the outer surface of the stiffener 20 between positions A and B, in which the position A is a position separated from the radially outward end 24 of the outer ply 10 (which means a radially outward end of the turnup portion 6 or the reinforcing ply 9. In the illustrated embodiment, the radially outward end of the turnup portion 6 is higher than the radially outward end of the reinforcing ply 9, so that the radially outward end 24 corresponds to the radially outward end of the turnup portion 6) by the diameter d of cords embedded in the outer ply 10 (corresponding to the turnup portion in a direction of separation from the bead core. The position B is a position separated from the radially outward end 24 of the outer ply 10 by 30 times the cord diameter d. In this case, when the position F, being an axially outward end of the boundary plane X, is radially inward from the position A, the outer stiffener portion 22 absorbing the bending approaches much to the radially outward end 24 of the outer ply 10 and the bending is easy to transfer into the radially outward end 24 of the outer ply 10. Consequently the compression strain of rubber in the vicinity of radially outward end 24 of the outer ply 10 increases to generate separation failure. On the other hand, when the position F is radially outward from the position B, the inner stiffener portion 21 having a hardness higher than that of the outer stiffener portion 22 is excessively radially outward from the radially outward end 24 of the outer ply 10. Hence the absorption of compression strain is not effectively conducted. Thus the position F should be between the positions A and B. Concretely, the position F is separated from the radially outward end 24 of the outer ply 10 by about 2 times of the cord diameter d=1.1 mm, i.e. a distance of 2 mm.

The position G is an optional position on the inner surface of the stiffener 20 between positions D and E, in which the position D is a position separated from an intersection C between a straight line L passing through the radially outward end 24 of the outer ply 10 and perpendicular to the inner surface of the stiffener 20 and the inner surface of the stiffener 20 by 30 times the cord diameter d in a direction of separation from the bead core 2. The position E is a position separated from the intersection C by 10 times the cord diameter d in a direction approaching the bead core 2. In this case, when the position, being an axially inward end of the boundary plane X, is radially inward from the position E, the region of the outer stiffener portion 22 contacting with the carcass ply 4 becomes longer and the stiffener 20 as a whole becomes flexible. Hence the bending of the sidewall portion 23 becomes large in the contacting the ground, so that the shearing strain at the region between the outer ply 10 and the carcass ply 4 increases and particularly the shearing strain concentrates axially inwardly from the radially outward end 24 of the outer ply 10 to generate separation failure, on the other hand, when the position G is radially outward from the position D, the inner stiffener portion 21 having a hardness higher than that of the outer stiffener portion 22 is excessively radially outward from the radially outward end 24 of the outer ply 10. Hence the absorption of compression strain is not effectively conducted, so that the position G should be between the positions D and E. Concretely, the position G is separated from the intersection C in a direction separating from the bead core 2 by about 3 times of the cord diameter d=1.1 mm, i.e. a distance of 3 mm.

A belt 26 is superimposed around a crown portion of the carcass ply 4 and comprised of at least two belt plies 27 each containing inextensible cords therein. The cords of these belt plies 27 are inclined at a given angle with respect to an equatorial plane S of the tire and crossed with each other. A tread rubber 28 is arranged radially outward on the belt 26 and provided at its outer surface with a plurality of main grooves 29 extending circumferentially of the tire and many lateral grooves crossing with the main groove 29 (not shown).

FIGS. 3 and 4 show second and third embodiments of the pneumatic tire according to the invention. In these embodiments, a boundary plane Y connecting a position K to a position M is further arranged radially inside of the boundary plane X, whereby a stiffener 30 is divided into a base stiffener portion 31 located radially inward from the the boundary plane Y, an inner stiffener portion 32 located radially outward from the boundary plane Y and radially inward from the boundary plane X, and an outer stiffener portion 33 located radially outward from the boundary plane X. The base stiffener portion 31 is composed of rubber having a Shore A hardness of not less than 75° (concretely 84°). The inner stiffener portion 32 is composed of rubber having a Shore A hardness of 58° to 68° for the aforementioned reasons. The outer stiffener portion 33 is composed of rubber having a Shore A hardness of not more than 55°, also for the above reasons. Also, the volume ratio of the outer stiffener portion 33 in the full stiffener 30 is not less than 10%, again for the aforementioned reasons.

In FIG. 3, the base stiffener portion 31 enhances the rigidity of the bead portion 7 to control the deformation of the carcass ply 4 in contact with the ground and keeps the shape of the bead core 2 during the running of the tire to increase the durability of the bead portion 7. In FIG. 4, the base stiffener portion 31 keeps the shape of the bead core 2 during the running of the tire without attempting the deformation control of the carcass ply 4 to improve the durability of the bead portion 7. The reason why the Shore A hardness of the base stiffener portion 31 is limited to not less than 75° is due to the fact that when it is less than 75°, the deformation control of the carcass ply 4 and the shape retention of the bead core 2 can not sufficiently be attained.

The position K is a position on the outer surface of the stiffener 30 located at a side of approaching from a position J to the bead core 2 when position J is located on the outer surface of the stiffener 30 and separated from the radially outward end 24 of the outer ply 10 by 10 times the cord diameter d in a direction approaching to the bead core 2, and the position M is a position located on the inner surface of the stiffener 30 and at a side of approaching from the position G to the bead core 2. When the position K is at a side of separation from the bead core 2 beyond the position J, the radially outward end portion of the outer ply 10 is restrained by the base stiffener portion 31 having a high rigidity and is hardly deformed. Hence the compression strain produced in the vicinity of the radially outward end 24 of the outer ply 10 becomes large, so that the position K should be located at a side of approaching from the position J toward the bead core 2. On the other hand, when the position M is at a side of separation from the bead core 2 around the position G or the base stiffener portion 31 comes into contact with the outer stiffener portion 33, stress concentration is caused in the contacted portion having a large hardness difference to create cracks. Thus the position M should be located at a side of approaching from the position G toward the bead core 2. Moreover, the boundary plane Y connecting the position K to the position M is preferably located radially inward from a straight line Z passing the position J on the outer surface of the stiffener 30 and the position G on the inner surface of the stiffener 30. This is because, when a part of the boundary plane Y is radially outward from the straight line Z, the rigidity of the bead portion 7 increases and hence there is a fear of generating heat in the bead portion 7 and increasing the rolling resistance. Concretely, the position K in FIG. 3 is separated from the radially outward end 24 of the outer ply 10 by about 18 times the cord diameter or a distance of 20 mm, and also the position M is separated at a side of approaching from the position G by about 5 times the cord diameter d or a distance of 5 mm toward the bead core 2. Furthermore, the position K in FIG. 4 is separated from the radially outward end 24 of the outer ply 10 by about 8 times the cord diameter d or a distance of 20 mm, and also the position M is separated at a side of approaching from the position G by about 25 times of the cord diameter d or a distance of 27 mm toward the bead core 2.

The invention will be described with reference to the following test example below.

In the test example, there were provided a test tire 1 as shown in FIG. 2, a test tire 2 as shown in FIG. 3, and a comparative tire having the same structure as in the test tire 1 except that the whole of the stiffener was composed of rubber having the same Shore A hardness (63°). In this case, each of these tires had a tire size of 11R22.5. Then, each tire was inflated under an internal pressure of 8.0 kg/cm$^2$ and run on a drum of 1.7 m in diameter at a speed of 60 km/h under a loading of 6000 kg until the radially outward end of the outer ply was broken, during which the durability of bead portion was measured and evaluated by an index on the basis that the running distance of 12400 km in the breakage of the comparative tire was 100. As a result, the test tire 1 was 115 and the test tire 2 was 123, from which it was apparent that the durability of bead portion was excellent. Furthermore, each of the above three tires was inflated under an internal pressure of 7.0 kg/cm$^2$ and run at a speed of 50 km/h under a loading of 2725 kg to measure the rolling resistance represented by an index on the basis that the comparative tire was 100. As a result, the index value of the rolling resistance in the test tire was 97 and that in the test tire 2 was 99, from which it was apparent that these test tires showed no increase of the rolling resistance. Moreover, the actual value of the rolling resistance when the index value was 100 was 11.3 kg.

In the above embodiments, the height of the turnup portion 6 is higher than that of the reinforcing ply 9, so that the radially outward end of the turnup portion 6 corresponds to the radially outward end 24 of the outer ply 10. However, when the height of the reinforcing ply 9 is higher than that of the turnup portion 6, the radially outward end of the reinforcing ply 9 corresponds to the radially outward end 24 of the outer ply 10. Furthermore, the reinforcing ply 9 and the auxiliary reinforcing plies 16 are arranged outside the turnup portion 6 in the above embodiments, but these plies may be omitted, if necessary.

As mentioned above, according to the invention, the separation failure in the vicinity of the radially outward end of the outer ply inclusive of the turnup portion of the carcass ply can be prevented while preventing the increase of the tire weight and the increase of the rolling resistance.

What is claimed is:

1. A bead portion structure in a pneumatic tire comprising a radial carcass comprised of at least one carcass ply containing cords substantially extending in radial direction of the tire and wound around each of bead cores from inside toward outside to form a turnup portion, an outer ply which includes the turnup portion and is arranged outside the carcass ply in an axial direction of the tire and extended along the carcass ply, said outer ply containing cords each having a modulus of elasticity of not less than 2500 kg/mm$^2$ and a diameter d, said bead portion structure further including a rubber stiffener arranged at its radially inward portion between the carcass ply and the outer ply and contacted at its radially inward end with the bead core, said rubber stiffener being comprised of rubber portions having different hardnesses, characterized in that a position A is located on the outer surface of the stiffener and is separated from the radially outward end of the outer ply by the cord diameter d in a direction of separation from the bead core and a position B is located on the outer surface of the stiffener and is separated from the radially outward end of the outer ply by 30 times the cord diameter d in a direction of separation from the bead core, a position C is an intersection of a straight line L passing the radially outward end of the outer ply and perpendicular to the inner surface of the stiffener and a position D separated from the intersection C by 30 the cord diameter d in a direction separating from the bead core, a position E is located on the inner surface of the stiffener and separated from the intersection C by 10 times the cord diameter d in a direction approaching the bead core, a position F is located on the outer surface of the stiffener between the positions A and B, and a position G is located on the inner surface of the stiffener between the positions D and E, said stiffener is divided into an inner stiffener portion located radially inward from a boundary plane X connecting the position F to the position G and an outer stiffener portion located radially outward from the boundary plane X, the inner stiffener portion being comprised of rubber having a Shore A hardness of 58° to 68° and the outer stiffener portion being comprised of rubber having a Shore A hardness of not more than 55°, and a volume ratio of the outer stiffener portion in the stiffener is not less than 10%.

2. A bead portion structure in a pneumatic tire comprising a radial carcass comprised of at least one carcass ply containing cords substantially extending in radial direction of the tire and wound around each of bead cores from inside toward outside to form a turnup portion, an outer ply which includes the turnup portion and is arranged outside the carcass ply in an axial direction of the tire and extended along the carcass ply, said outer ply containing cords each having a modulus of elasticity of not less than 2500 kg/mm² and a diameter d, said bead portion structure further including a rubber stiffener arranged at its radially inward portion between the carcass ply and the outer ply and contacting at its radially inward end with the bead core, said rubber stiffener consisting of rubber positions having different hardnesses, characterized in that a position A is located on the outer surface of the stiffener and separated from the radially outward end of the outer ply by the cord diameter d in a direction of separation from the bead core and a position B is located on the outer surface of the stiffener and is separated from the radially outward end of the outer ply by 30 times the cord diameter d in a direction of separation from the bead core, a position C is an intersection of a straight line L passing the radially outward end of the outer ply and perpendicular to the inner surface of the stiffener with the inner surface of the stiffener, a position D is located on the inner surface of the stiffener and separated from the intersection C by 30 times the core diameter d in a direction separating from the bead core, a position E is located on the inner surface of the stiffener and separated from the intersection C by 10 times the cord diameter d in a direction approaching the bead core, a position J is located on the outer surface of the stiffener and separated from the radially outward end of the outer ply by 10 times the cord diameter d in a direction approaching the bead core, a position F is located on the outer surface of the stiffener between the positions A and B, a position G is located on the inner surface of the stiffener between the positions D and E, a position K is located on the outer surface of the stiffener and at a side of approaching from the position J to the bead core, and a position M is located on the inner surface of the stiffener and at a side of approaching from the position G to the bead core, said stiffener is divided into a base stiffener portion located radially inward from a boundary plane Y connecting the position K to the position M, an inner stiffener portion located radially outward from the boundary plane Y and radially inward from a boundary plane X connecting the position F to the position G and an outer stiffener portion located radially outward from the boundary plane X, the base stiffener portion consisting of a rubber having a Shore A hardness of not less than 75°, the inner stiffener portion consisting of a rubber having a Shore A hardness of 58° to 68° and the outer stiffener portion consisting of a rubber having a Shore A hardness of not more than 55°, and a volume ratio of the outer stiffener portion in the stiffener is not less than 10%.

3. The bead structure according to claim 1 or 2, wherein the rubber comprising said outer stiffener portion has a Shore A hardness of 38° to 52°.

* * * * *